US009182311B2

(12) United States Patent
Clark et al.

(10) Patent No.: US 9,182,311 B2
(45) Date of Patent: Nov. 10, 2015

(54) ROTOR BALANCING METHOD

(71) Applicant: ROLLS-ROYCE PLC, London (GB)

(72) Inventors: Daniel Clark, Belper (GB); Stephen John Tuppen, Swadlincote (GB)

(73) Assignee: ROLLS-ROYCE PLC, London (GB)

( * ) Notice: Subject to any disclaimer, the term of this patent is extended or adjusted under 35 U.S.C. 154(b) by 309 days.

(21) Appl. No.: 13/917,134

(22) Filed: Jun. 13, 2013

(65) Prior Publication Data

US 2013/0340521 A1 Dec. 26, 2013

(30) Foreign Application Priority Data

Jun. 20, 2012 (GB) .................................. 1210870.0

(51) Int. Cl.
*G01M 1/16* (2006.01)
*G01M 1/32* (2006.01)
*F01D 5/02* (2006.01)
*F01D 5/10* (2006.01)
*F01D 21/04* (2006.01)
(Continued)

(52) U.S. Cl.
CPC ................. *G01M 1/16* (2013.01); *F01D 5/027* (2013.01); *F01D 5/10* (2013.01); *F01D 21/045* (2013.01); *F04D 29/321* (2013.01); *F04D 29/662* (2013.01); *G01M 1/32* (2013.01); *Y02T 50/671* (2013.01); *Y02T 50/673* (2013.01)

(58) Field of Classification Search
CPC ........... G01M 1/32; G01M 1/22; G01M 1/24; G01M 1/04; G01M 1/16; F16F 15/322; F16F 15/32; F01D 5/027; F01D 5/34

USPC .............. 73/462, 460, 468; 702/145, 173, 56, 702/189; 701/124
See application file for complete search history.

(56) References Cited

U.S. PATENT DOCUMENTS

| 5,199,992 | A | * | 4/1993 | Hines et al. .................... 118/669 |
| 5,724,271 | A | * | 3/1998 | Bankert et al. .................. 73/462 |
| 6,354,780 | B1 | | 3/2002 | Davis et al. |

(Continued)

FOREIGN PATENT DOCUMENTS

| DE | 10 2004 037 608 A1 | | 3/2006 |
| DE | 10 2009 054 103 | * | 5/2011 |

(Continued)

OTHER PUBLICATIONS

Search Report issued in British Application No. 1210870.0 dated Oct. 18, 2012.

*Primary Examiner* — Helen Kwok
(74) *Attorney, Agent, or Firm* — Oliff PLC

(57) ABSTRACT

A method of balancing a physical rotor includes: determining a first balance state of the physical rotor at one or more rotational frequencies; identifying one or more balance zones on a surface of the rotor; providing a computerised simulation of the rotor having the first balance state; providing a first test mass in a first test location within one of the balance zones on the rotor simulation; determining a second balance state of the rotor simulation; providing at least one subsequent test mass in at least one subsequent test location within a balance zone on the rotor simulation and determining at least one subsequent balance state of the rotor simulation; selecting a mass and location from one of the first and subsequent test masses and test locations; and performing a material deposition process to add the selected mass of material to the selected location on the physical rotor.

12 Claims, 3 Drawing Sheets

(51) Int. Cl.
*F04D 29/66* (2006.01)
*F04D 29/32* (2006.01)

(56) References Cited

U.S. PATENT DOCUMENTS

| | | | |
|---|---|---|---|
| 7,539,594 B2* | 5/2009 | Lee et al. | 702/147 |
| 2004/0237647 A1* | 12/2004 | Youells et al. | 73/462 |
| 2006/0053882 A1* | 3/2006 | Lee et al. | 73/460 |
| 2009/0263247 A1* | 10/2009 | Mollmann | 416/144 |
| 2010/0064801 A1* | 3/2010 | Hylton | 73/468 |
| 2010/0212422 A1* | 8/2010 | Allen et al. | 73/460 |

FOREIGN PATENT DOCUMENTS

| | | |
|---|---|---|
| DE | 10 2009 054 103 A1 | 5/2011 |
| EP | 1 188 900 A2 | 3/2002 |
| GB | 2 450 937 A | 1/2009 |

\* cited by examiner

ROTOR BALANCING METHOD

FIELD OF THE INVENTION

The present invention relates to a method of balancing a rotor, particularly but not exclusively, a rotor of a gas turbine engine.

BACKGROUND TO THE INVENTION

Rotating components such as gas turbine engine rotors (such as compressor and turbine discs and drums), wheels, crankshafts and drive shafts, which rotate about a centre of rotation, may become unbalanced such that the centre of mass of the rotor does not correspond to the centre of rotation. Once unbalanced, such rotors may then be subject to vibration in use, which is undesirable. An unbalanced rotor may then be balanced using any of several methods.

Conventional gas turbine engines, such as gas turbine engine 10 shown in FIG. 1, comprise a plurality of rotors, including fan 12, compressor rotors 16, 18 and turbine rotors 22, 24, 26. As shown in further detail in FIG. 2, each rotor comprises a disc 17 and a plurality of blades 19 removeably attached at the radially outer rim of the disc 17. Due to manufacturing variation, the blades 19 vary in size and mass distribution relative to one another, and relative to a nominal design. Material may also be moved or removed during use, for example by foreign object damage, which would also alter the size and mass distribution of the blades 19.

In a first prior balancing method, the blades 19 can be distributed around the circumference of the disc 17 in such a way that the variations in their weight can be used to compensate for rotor unbalance. In gas turbine engines, several discs are sometimes joined together to form a compressor drum 13 (see FIG. 2) or turbine drum (not shown). Balancing is then conventionally achieved with the rotors attached to form the drum 13.

However, in order to save weight, some gas turbine engine rotors comprise discs having integrally formed blades, known as "bladed disks" or "blisks". In some cases, the rotor comprises a ring having integrally formed blades, known as "bladed rings" or "blings". Since the blades are integrally formed with the disc/ring, the blades cannot be circumferentially distributed to balance the rotor.

In a second prior method, rotors such as blisks can be balanced by the removal of material from specific locations designed into the component known as "balancing lands", for example on a non-aerodynamic profile, such as the disc. During balancing, material is removed from the balancing land to reduce the weight of the blisk, and thereby balance the blisk or drum. However, the balancing land increases the overall weight of the disc. This can have a significant impact on the rotor as a whole, as still further material may be required in the disc to increase the strength to offset the increased centrifugal force produced by the increased weight in use. Furthermore, once all of the material has been removed from the balance land, no further balancing can take place. The disc would then have to be disposed of. There is therefore a compromise between weight and longevity of the disc in service using this method.

In a third prior method, balancing can also be achieved by adding bolted weights or dome head rivets to individual discs, or to the front and rear surfaces of the drum. However, this method may require access to both sides of the component, which may not be possible where the drum is welded together for instance. Such a method also requires a hole to be made in the surface of the disc, which may weaken it. The bolts used also have a minimum practical size. As a result, relatively large discrete weights are added using the process such that "fine tuning" of the balance state is difficult to achieve.

The present invention seeks to provide a method of balancing a rotor that overcomes some or all of these problems.

SUMMARY OF THE INVENTION

According to a first aspect of the present invention, there is provided a method of balancing a physical rotor, the method comprising the steps of:
  determining a first balance state of the physical rotor;
  identifying one or more balance zones on a surface of the rotor;
  providing a computerised simulation of the rotor having the first balance state;
  providing a first test mass in a first test location within one of the balance zones on the rotor simulation;
  determining a second balance state of the rotor simulation;
  providing at least one subsequent test mass in at least one subsequent test location within a balance zone on the rotor simulation and determining at least one subsequent balance state of the rotor simulation;
  selecting a mass and location from one of the first and subsequent test masses and test locations which provides a predetermined balance state; and
  performing a material deposition process to add the selected mass of material to the selected balance location on the physical rotor.

The invention therefore provides a balancing method in which the amount of material added to the rotor is minimised, which in turn reduces the overall mass of the rotor and reduces the tensile load on the rotor in use, while also precluding or reducing the requirement for applying a series of trial weights to the physical rotor. The invention relies on the realisation that the use of a material deposition process enables finer control over the location and mass of the balance mass, which can be determined by simulation of the rotor.

The selected mass and location may comprise the test mass and test location having a minimal balance mass which provides the predetermined balance state.

The selected mass and location may comprise the test mass and test location having a minimal rotor tensile load which provides the predetermined balance state at a maximum in use rotational frequency.

The selected mass and location may comprise the test mass and test location having a minimal balance mass which provides the predetermined balance state and having a rotor tensile load at a maximum in use rotational frequency below a predetermined amount.

The method may therefore ensure that the smallest amount of mass is added to the rotor to obtain the predetermined balance state of the rotor, while ensuring that the tensile loads on the rotor do not exceed a predetermined amount, or are minimised.

Alternatively, the selected mass and location may comprise the test mass and test location having a minimal rotor tensile load at a maximum in use rotational frequency which provides the predetermined balance state and having a balance mass below a predetermined amount. The tensile load may comprise a centrifugal load.

The method may therefore ensure that the smallest tensile load in use is exerted on the rotor by the mass while maintaining the balance mass below a predetermined maximum, and ensuring that the rotor is balanced to within predetermined limits. Different embodiments of the invention can therefore determine an optimised mass and location on the basis of either lowest mass or lowest stress, or a compromise between the two.

The one or more balance zones may be identified on the basis of areas of the rotor having one or more of a maximum predicted stress in use, a maximum likelihood of crack propagation following material deposition, minimum accessibility requirements, minimum load tolerance, minimum damage tolerance and maximum expected cycle fatigue.

By only applying test masses to locations having one or more of the above properties, the model can be carried out using fewer iterations, thereby reducing the computational complexity of the method, and either reducing the amount of time required for the model to run, or reducing the costs of the computer which performs the calculations.

Where the rotor comprises titanium alloy, the maximum predicted stress in use of the balance zone may be less than $200 \times 10^6$ Pascals (Pa).

Alternatively, where the rotor comprises nickel based alloy, the maximum predicted stress in use of the balance zone may be less than $600 \times 10^6$ Pascals (Pa).

The material deposition process may comprise one of blown powder direct laser deposition (DLD), plasma welding, Tungsten Inert Gas (TIG) welding, Metal Inert Gas (MIG) welding, Physical Vapour Deposition (PVD) or Chemical Vapour Deposition (CVD).

The method may be repeated at a first rotational frequency and at a second rotational frequency. Where the method is repeated at a second rotational frequency, the model may be adjusted to include the test mass in the selected location selected during the first iteration.

The material deposited to the selected balance location may have a density gradient. By utilising a density gradient, a hard outer surface can be provided. Alternatively or in addition, the density gradient can be used to modify the balance properties of the deposited material.

According to a second aspect of the invention, there is provided a rotor balanced in accordance with the first method of the invention.

According to a third aspect of the invention, there is provided a gas turbine engine comprising a rotor in accordance with the second aspect of the invention.

BRIEF DESCRIPTION OF THE DRAWINGS

Embodiments of the invention will now be described by way of example with reference to the accompanying drawings in which.

DETAILED DESCRIPTION

Figure 1:
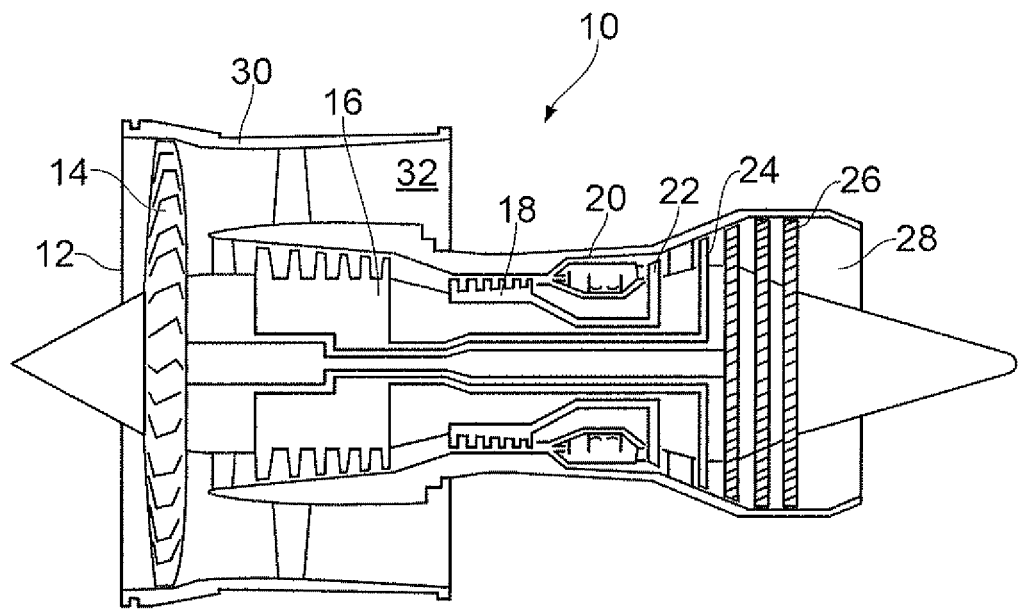
FIG. 1 shows a diagrammatic representation of a gas turbine engine.

A gas turbine engine 10 is shown in FIG. 1 and comprises an air intake 12 and a propulsive fan 14 that generates two airflows A and B. The gas turbine engine 10 comprises, in axial flow A, an intermediate pressure compressor 16, a high pressure compressor 18, a combustor 20, a high pressure turbine 22, an intermediate pressure turbine 24, a low pressure turbine 26 and an exhaust nozzle 28. A nacelle 30 surrounds the gas turbine engine 10 and defines, in axial flow B, a bypass duct 32.

Figure 3:
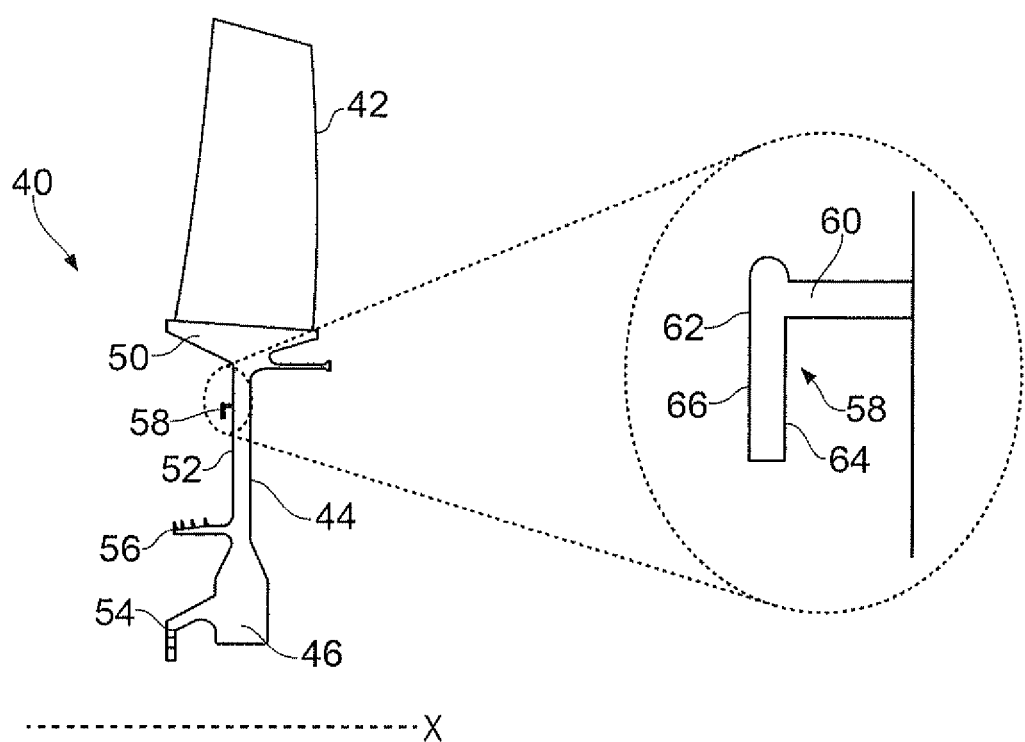
FIG. 3 shows a side cross sectional view through a blisk.

FIG. 3 shows a rotor 40 of the gas turbine engine 10. In this example, the rotor 40 is an integrally formed intermediate compressor blisk 40, also known as a "bladed disk". However, the invention is also applicable to rotors in other parts of the engine, such as the high pressure compressor disc 18 and turbine rotors 20, 22, 24, as well as other types of gas turbine rotors such as conventional rotors to which separately formed blades are attached, and rotors for other types of machinery.

The rotor 40 comprises a circular metal disc 44. The disc 44 has a flange 46 at an inner edge of the rotor 40 and a platform 50 at an outer edge of the disc 44. The flange 46 and platform 50 are connected by a diaphragm 52 which is thinner than the flange 46 and platform 50. A plurality of blades 42 are spaced around the circumference of the platform 50 at an outer edge of the disc 44. Each blade 42 has an aerofoil cross-section.

A drive arm 54 is provided on the flange 46 at the inner edge of the disc 44. The drive arm 54 is connected to a shaft (not shown) of a turbine which drives the rotor 40. Seal fins 56 extend axially from the disc 44 and cooperate with a seal surface of an adjacent component such as a stator (not shown), to prevent air from being lost at the interface between the two components.

A balance hook 58 also extends from the diaphragm 52 of the disc 44. A plurality of these balance hooks 58 may be provided around the diaphragm 52. With reference to the enlarged view of FIG. 3, the balance hook 58 comprises an axial portion 60 which is joined to the diaphragm 52 and projects in an axial direction from the diaphragm 52. The balance hook 58 further comprises a radial portion 62 which is joined perpendicularly to the axial portion 60 and extends towards the inner edge of the diaphragm 52 in a radial direction. The radial portion 62 comprises an inner surface 64 which faces towards the diaphragm 52 and an outer surface 66 which faces away from the diaphragm 52.

Figure 2:
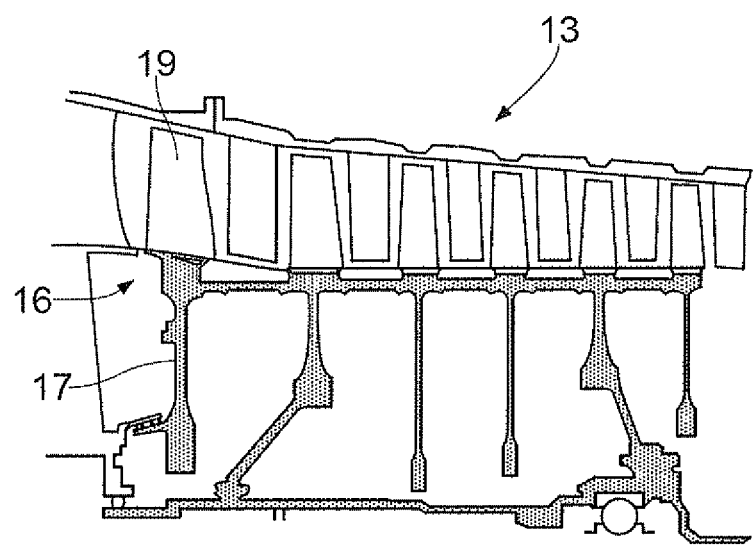
FIG. 2 shows a compressor drum of the gas turbine of FIG. 1.

The rotor 40 may be joined (such as by welding or bolting) or integrally formed with one or more similar rotors 40 to form a drum 13, as shown in FIG. 2. In use, the rotor 40 turns about an axis of rotation X.

The rotor 40 or drum 13 can be balanced by the following method in accordance with the invention.

The balance state of the physical rotor 40 is determined by a balancing machine (not shown). The machine performs a first run in which the rotor is turned about the axis X at an initial predetermined rotational frequency which may for instance correspond to an idle, cruise or maximum take off power frequency. While the rotor 40 is turned, the vibration angle and magnitude are measured. A trial mass is then added to the rotor 40 at a known location such as a balance land. A second run is then performed, in which the rotor 40 is turned about the axis X at the predetermined rotational frequency, and the vibration angle and magnitude are again measured. The balancing machine thereby determines the balance state of the rotor 40 by a comparison of the vibration magnitude and phase angle of the rotor during the first and second runs.

The rotor 40 is then scanned using a conventional 3-d object scanning method to determine the external geometry of the rotor 40. One suitable scanning method may comprise a stereo optical method. In such a method, a structured light pattern is projected on the rotor 40, and the points are observed by a camera. Their relative positions are then determined by triangulation. The positions then form a cluster or point cloud relative to a known reference, such as a calibration artefact located on the rotor 40. The positions can be joined to form a surface model of the rotor 40. A computer algorithm may be used to smooth the surface to produce a 3-d geometrical model of the rotor 40. The blade 42 and the balance lands 58 may be scanned in more detail relative to the remainder of the rotor 40, since these areas may vary significantly from their nominal values, and may have a relatively large effect of the balance state of the rotor 40 in view of their locations. Alternatively, the scanning step could be carried out prior to the balancing step.

The balance state data from the balancing machine is then combined with the geometrical data from the scanning step and a known material density value to produce a computerised model of the rotor 40, such as a finite element model.

The finite element model of the rotor 40 is compared to a model of a nominal rotor to identify the locations of one or more "balance zones" on the rotor 40. The nominal model comprises one or more "balance zones", which are zones in which material can be added or subtracted without an excessively detrimental effect on the function of the rotor. Generally, the one or more balance zones are identified on the basis of areas of the rotor 40 having one or more of a maximum predicted stress in use, a maximum likelihood of crack propagation following material deposition, minimum accessibility requirements, minimum load tolerance, minimum damage tolerance and maximum expected cycle fatigue.

For example, where the rotor 40 comprises titanium alloy (for example for a compressor rotor), the balance zones are located in areas having a maximum predicted stress in use of less than $200 \times 10^6$ Pascals (Pa). Where the rotor comprises a nickel based alloy (for example, a turbine rotor), the balance zones are located in areas having a maximum predicted stress in use of less than $600 \times 10^6$ Pa. For example, suitable balance zones could comprise the diaphragm 52, or the balance land 58. In some embodiments however, the balance lands 58 may be omitted.

Once the balance zones 52, 58 are identified, a first test mass is added to the rotor simulation at a first location within one of the balance zones. The new, second, balance state of the rotor simulation is then determined by the simulation. The simulation also determines the tensile load of the rotor 40 at a predetermined rotational speed, which would generally be the maximum rotational speed to which the rotor will be subject in use, plus a margin. For example, for the intermediate pressure compressor 16, the maximum rotational speed will generally be around 10,000 rpm and the margin will be 10%.

The second balance state of the rotor simulation is then compared to the first balance state of the rotor simulation to determine whether either balance state is within the required parameters. In general, when balancing a component, it is desirable that the vibration magnitude and phase angle are minimised, or at least reduced to a predetermined value such that the component can be considered to be "in balance".

The process is then repeated, such that further test masses are added in further locations within the one or more balance zones, and the balance state of each test mass in each location is assessed. Before the second or subsequent test masses are added, the one or more previous test masses may be removed from the simulation. Alternatively, several test masses may be built up in several locations. A maximum predetermined mass may be set, so that not more than the maximum predetermined mass is added to any location on the rotor simulation.

Once all the possible locations and test masses have been placed on the simulated rotor, and the balance state of each location is determined, a test mass and location, or several test masses and locations are then chosen for material deposition on the rotor 40.

The test mass and location chosen for material deposition on the rotor 40 may be chosen on the basis of a "goal search" or "optimiser" routine. For example, the first and subsequent test masses that have a tensile load of the rotor 40 at the predetermined rotational speed greater than a predetermined value are discarded. The predetermined value will be determined by the properties of the rotor, for example, the material, construction and target life of the rotor 40. In one example, the predetermined tensile load for an intermediate compressor 16 rotor comprising titanium alloy will be $200 \times 10^6$ Pascals (Pa). In another example, the predetermined tensile load for a high pressure turbine 22 rotor comprising nickel based alloy will be $600 \times 10^6$ Pascals (Pa).

The remaining test masses are then compared, and the test mass and location, or test masses and locations having a balance state which corresponds to the required parameters, and comprises the least mass, is selected from the test masses and locations. The above method could be carried out in any order, for example such that the balance state is assessed first, and mass and locations that do not correspond to the required balance state discarded.

In an alternative embodiment, the test mass and location chosen for material deposition on the rotor 40 could be chosen on the following basis. The first and subsequent test masses that have a mass greater than a predetermined value are discarded. The predetermined value will be determined by the properties of the rotor, for example, the material, construction and target life of the rotor 40.

The remaining test masses are then compared, and the test mass and location, or test masses and locations having a balance state which corresponds to the required parameters, and has the least tensile load, is selected from the test masses and locations.

The first and subsequent test masses and locations could be compared after every potential test mass and location has been simulated. Alternatively, the comparison step could be made after each subsequent test mass and location is simulated, and a test mass and location could be selected once one of the compared test mass and location once a mass and located is identified which produces the required balance state.

In a further alternative, each of the test masses and locations which provides a balance state which corresponds to the required parameters is given a score on the basis of one or more of the following factors: mass (with a lower mass generating a higher score), tensile load (with a lower load generating a higher score), accessibility (with more accessible locations generating a higher score), likelihood of crack propagation following material deposition at the location (with a lower likelihood generating a higher score), and damage tolerance of the location (with a higher damage tolerance generating a higher score). The corresponding scores of each of the test masses and locations are compared, and the test mass and location with the highest score is selected. The factors may be weighted, such that, for example, mass and tensile load are given greater weight in the scoring than other factors, and the weighting may be altered in accordance with operational requirements.

A material deposition process is then applied to the rotor 40 to apply the selected mass to the selected location. The material deposition process could preferably be carried out with the rotor mounted on the balancing machine. Since the scanning and rotor simulation steps can also be carried out with the rotor mounted on the balancing machine, the rotor does not have to be manually handled during the balancing process.

The material deposition process may comprise a "net shape" deposition process, in which the deposited weight has the required shape and mass to within predetermined tolerances. Alternatively, the material deposition process may comprise a "near net shape" deposition process, in which the deposited weight has a size and mass which is greater than the required size and mass. Where a near net shape deposition process is utilised, additional material is added during the material deposition process, which is then removed by a machining step, in which material is removed from the weight until the shape and mass of the weight corresponds to the required shape and mass to within predetermined tolerances.

Any one or more of several material deposition techniques could be used, including for example blown powder Direct Laser Deposition (DLD), plasma welding, Tungsten Inert Gas (TIG) welding, Metal Inert Gas (MIG) welding, PVD or CVD. A preferred method for this process is blown powder OLD, since this method has a relatively high deposition rate.

The blown powder OLD process operates as follows. A powdered metal having a particle size typically less than 150 microns, and preferably in the range 50 to 150 microns, is first deposited on a surface of the rotor 40 in an inert atmosphere, using for example an argon shield gas, at a target location by a nozzle assembly. The nozzle assembly comprises a side feed or lateral feed nozzle and a reservoir which stores the powdered metal. The target location corresponds to the selected location. Pressurised gas is used to eject the powdered metal from the reservoir and to direct it towards the target location on the rotor 40. An energy beam such as a laser is then used to melt the powdered metal and fuse the powdered metal to the rotor 40 at the target location. The laser beam used for the OLD process has a power of 200-1000 W and a spot size of 0.2-2 mm. Repeated layers of powder are deposited and bonded to the surface until a balance weight is formed which corresponds in weight to one of the selected test masses.

Figure 4:
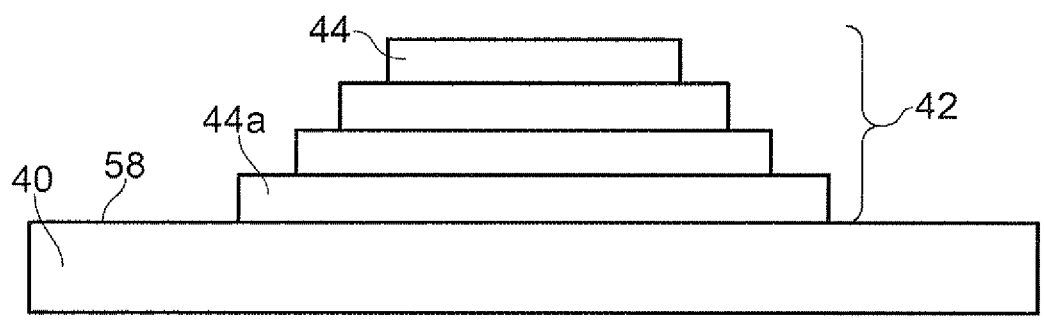
FIG. 4 shows a side profile view of a balance mass deposited on a balance zone of the blisk of FIG. 3.
Figure 5:
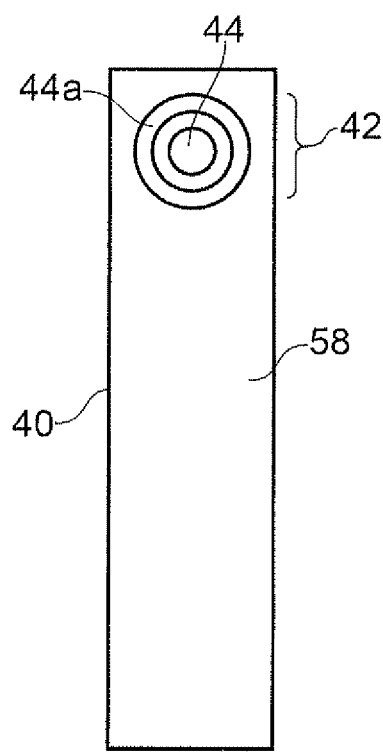
FIG. 5 shows a plan view of the balance mass of FIG. 4.

In one embodiment, as shown in FIGS. 4 and 5, the balance weight 42 is formed as a plurality of "segments" 44 which are stacked on top of one another. In the example shown, each segment 42 is a circular disc. The segments 44 decrease in diameter such that the segment 44a adjacent to the inner surface 58 has the greatest diameter and each successive segment stacked on top has a smaller diameter. The segments 44 are concentric. Each of the segments 44 are of a known mass.

The material of the segments may have the same composition to that of the component. For example, where the rotor 40 comprises titanium alloy, the segments 44 also comprise titanium alloy. Alternatively the material of the segments 44 may have a different composition to that of the component. The density of the material of the segments 44 is selected so as to alter the balancing effect it provides.

In alternative embodiments, each segment may be polygonal in a plan view, where the segments 44 decrease in width such that the segment 44a adjacent to the inner surface 58 has the greatest width and each successive segment stacked on top has a smaller width. The segments 44 are coaxial such that each smaller polygonal layer sits within the boundary of the preceding larger layer. Each of the segments 44 is of a known mass.

The segment 44 may be formed on the surface 58 of the rotor 40 using a direct laser deposition (DLD) process. As described above, the DLD process uses a laser beam to melt a powdered metal which is deposited on the rotor 40 and to fuse the powdered metal to the surface 58 of the rotor 40 to form a segment 44.

Each segment 44 may be formed in a single pass of the laser and powdered metal, or may be formed in several passes depending on the required thickness of each segment 44. The resultant balancing weight 42 may have a pyramid shape, conical shape, or frusto conical shape.

As a result of the layered, segmented balance weight 42, individual layers can be individually identified, and removed in a subsequent machining step if necessary. The shape of the segments 44, comprising thin progressively smaller segments 44 stacked on top of one another, also minimises stress concentration in the boundary between the weight 42 and the surface 58 of the rotor. To further reduce stress concentration in the boundary between the weights 42 and the surface 58, the edges (or "tiers") of segments 44 shown in the FIGS. 4 and 5 embodiments may be smoothed such that they are rounded and/or blend together to form a continuous surface. The stress concentration in the boundary between the weights 42 and the surface 58 may be further reduced by appropriate control of thermal gradients across the weight 42 and the rotor 40 by, or by using particular deposition patterns and orientations. For example, the layer height may be minimised (i.e. the thickness of each segment 44 is minimised), and the temperature difference between successive segments 44 may also be minimised by heating or controlled cooling of the preceding segments 44.

The material deposition process may be configured to produce a weight 42 having a density gradient, for example, from a lower density for the segments close to the surface 58 of the rotor 40, and a higher density for the segments toward the top of the weight 42.

In another embodiment, the weights 42 may be deposited in recesses in the surface of the rotor 40, which may for example have a hemispherical shape.

Once the balance weights 42 having the selected mass are deposited in the selected locations, the rotor 40 may be tested again on the balancing machine. If the rotor 40 is still found to be out of balance, the above process may be repeated. One or more of the segments 44 of one or more of the weights 42 may be removed, and the rotor 40 tested for balance again.

The invention provides an improved balancing method having a number of advantages over prior methods. The computerised simulation determines the correct location of the balance weights to attain a required balance state without requiring trial and error, and may optimise the location such that the mass and/or tensile load on the rotor is minimised. As a result, the overall weight of the component is minimised, and/or the life of the component is maximised. The reduced overall weight following rebalancing can be taken into account during design of the rotor, resulting in subsequent further weight reductions due to the reduced structural requirements of the rotor. Furthermore, the balance lands can be reduced in size or omitted, as material can be added directly to the disc, resulting in a further reduction in weight. Since material can be repeatedly added or removed from a wide variety of locations, no parts of the blade, such as balance lands, need be permanently removed, thereby increasing the number of balance operations that can be carried out, and consequently further increasing the potential life of the rotor. In subsequent rebalancing, the weights can be removed by machining, ensuring that the rotor does not increase in weight during its life.

The material deposition process allows the masses to be deposited in any suitable location to within a high degree of accuracy. The reduced stress concentration reduces the risk of one or more weights detaching. The invention therefore results in a safer balancing method. In particular, where the rotor comprises a rotor of a gas turbine engine, the risk of domestic object damage (DOD) to the rotor or downstream components is thereby reduced. The material deposition process also only requires access from one side of the rotor, which can be particularly beneficial where the rotor comprises a drum for example.

The shape of the deposited weights allows small amounts of material to be removed relatively easily, reducing the labour and therefore cost for subsequent balance corrections.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For example, after a component has been balanced, the resulting optimal balance masses and location determined by the method may be stored in a database. This database could then be used to narrow the range of simulated test masses and locations for subsequent balancing of similar components. Alternatively, the database could determine the order in which the test masses and locations are compared.

Prior to repair of previously balanced components, previously applied balance weights could be removed to return the rotor to a geometry closer to its nominal geometry. Such a further step would also ensure that a minimal amount of weight is added to the rotor.

Although powder DLD has been described for the material deposition step, other suitable material deposition methods could be employed. For example, the powder could be replaced by a wire. Similarly, the laser heat source could be replaced by a different energy beam, such as an electron beam. Material could be added as a preformed block comprising a binder. To consolidate the powder and bind it to the surface of the rotor, the binder would be removed by volatilisation, sublimation or decomposition.

Although the material deposited in the material deposition process has been described as comprising the same as the material of the rotor, a different material may be used. The deposited material may be chosen for improved weldability, lower cost, or improved crack propagation behaviour in comparison to the material of the rotor.

Although the method has been described in relation to rotors for gas turbines, other components which require balancing could also be balanced using the method of the present invention, for example, rotors for turbo pumps of rocket motors, telescope mirrors, ground wheels for vehicles, marine propulsion components such as propellers, impellers and shafts, turbocharger impellors, washing machine drums, rock grinders and washing machines.

The invention claimed is:

1. A method for balancing a physical rotor, the method comprising the steps of:
    determining a first balance state of the physical rotor;
    identifying one or more balance zones on a surface of the physical rotor;
    providing a computerised simulation of the physical rotor having the first balance state;
    providing a first test mass in a first test location within one of the balance zones on the physical rotor simulation;
    determining a second balance state of the physical rotor simulation;
    providing at least one subsequent test mass in at least one subsequent test location within a balance zone on the physical rotor simulation and determining at least one subsequent balance state of the physical rotor simulation;
    selecting a mass and location from one of the first and subsequent test masses and test locations which provides a predetermined balance state; and
    performing a material deposition process to add the selected mass of material to the selected location on the physical rotor, the selected mass being formed of a plurality of progressively smaller segments fused to the selected location on the physical rotor.

2. The method according to claim 1, wherein the selected mass and location includes the test mass and test location having a minimal balance mass which provides the predetermined balance state.

3. The method according to claim 1, wherein the selected mass and location comprises the test mass and test location having a minimal rotor tensile load for a predetermined balance state at a maximum in use rotational frequency.

4. The method according to claim 1, wherein the selected mass and location comprises the test mass and test location having a minimal balance mass which provides the predetermined balance state and having a rotor tensile load for a predetermined balance state at a maximum rotational frequency below a predetermined amount.

5. The method according to claim 1, wherein the selected mass and location comprises the test mass and test location having a minimal rotor tensile load for a predetermined balance state at a maximum rotational frequency and having a balance mass below a predetermined amount.

6. The method according to claim 1, wherein the one or more balance zones are identified on the basis of areas of the physical rotor having one or more of a maximum predicted stress in use, a maximum likelihood of crack propagation following material deposition, minimum accessibility requirements, minimum load tolerance, minimum damage tolerance and maximum expected cycle fatigue.

7. The method according to claim 6, wherein where the physical rotor comprises titanium alloy, and the maximum predicted stress in use of the balance zone is less than $200 \times 10^6$ Pascals (Pa).

8. The method according to claim 6, wherein where the physical rotor comprises nickel based alloy, and the maximum predicted stress in use of the balance zone is less than $600 \times 10^6$ Pascals (Pa).

9. The method according to claim 1, wherein the material deposition process includes at least one of blown powder direct laser deposition, plasma welding, Tungsten Inert Gas (TIG) welding, Metal Inert Gas (MIG) welding, PVD or CVD.

10. The method according to claim 1, wherein the method is repeated at a first rotational frequency and at a second rotational frequency.

11. The method according to claim 1, wherein the material deposited to the selected balance location has a density gradient.

12. The method according to claim 1, wherein the one or more balance zones on the surface of the physical rotor includes a balance hook having an inner surface aligned in a radial direction of the physical rotor.

* * * * *